Patented July 14, 1942

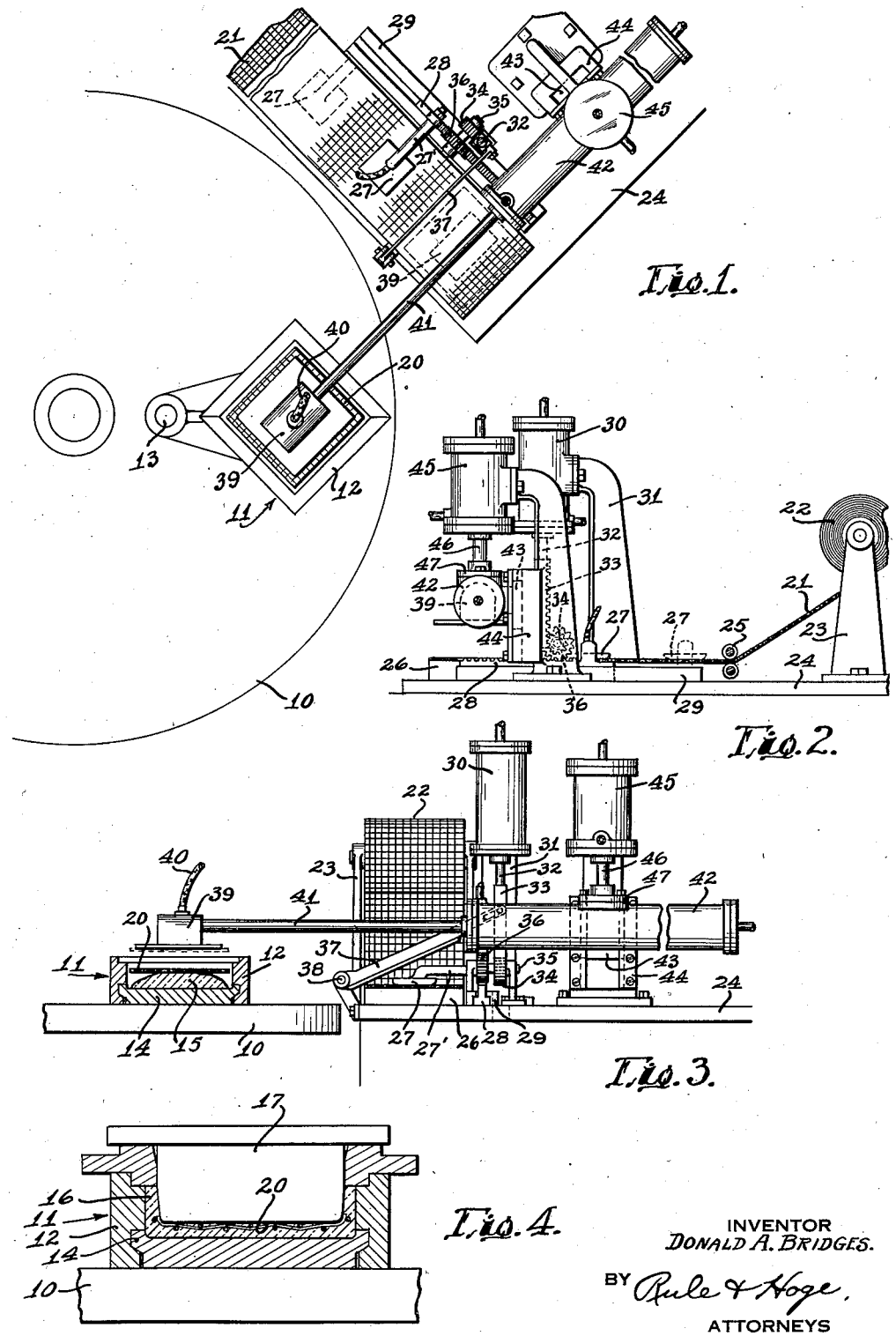

2,290,138

UNITED STATES PATENT OFFICE 2,290,138

MECHANISM FOR HANDLING WIRE MESH

Donald A. Bridges, Muncie, Ind., assignor to Owens-Illinois Glass Company, a corporation of Ohio Application February 23, 1940, Serial No. 320,295

4 Claims. (Cl. 164—42)

My invention relates to mechanism for handling wire screen or the like and as herein illustrated comprises automatic mechanism for advancing a strip of wire mesh, cutting the strip into individual pieces of suitable length and transferring the pieces to a mold containing molten or plastic glass or the like in which the wire is to be embedded.

An object of the invention is to provide mechanism of the character indicated, adapted for use with a molding machine for molding glass building blocks or other glass articles in which the wire mesh is to be embedded.

A further object of the invention is to provide an apparatus for feeding, cutting and transferring wire mesh material, which is of simple construction and efficient and reliable in operation.

Other objects of the invention will appear hereinafter.

Referring to the accompanying drawing:

Fig. 1 is a plan view of mechanism embodying the principles of my invention;

Fig. 2 is a side elevation of the same;

Fig. 3 is a front elevation of the same; and

Fig. 4 is a sectional elevation of a press mold.

The mechanism as herein shown is particularly adapted for supplying pieces of wire mesh to the molds of a machine for molding hollow glass building blocks or the like in which pieces of the wire mesh are embedded. The molding machine comprises a mold table or carriage 10 which is mounted for rotation about a vertical axis and driven intermittently step by step. Press molds 11 are mounted on the table 10 and each comprises a pair of partible mold sections 12 pivoted at 13, and a mold bottom 14. Mold charges 15 or gobs of molten glass are deposited in the molds and each pressed to form a hollow section 16 of a building block by means of a press head 17.

The construction and operation of the molding machine is conventional and in itself forms no part of the present invention. The latter deals particularly with mechanism for supplying to the molds pieces 20 of wire screen or fabricated material which are to be embedded in the glass articles. The pieces 20 are supplied by a strip 21 of the woven wire mesh drawn from a supply roll 22 of the material mounted on standards 23 attached to the base plate 24. The strip 21 passes between guide rolls 25 and is gripped by a gripping device such as an electromagnetic pad 27 and fed forward over a supporting table 26. The pad is carried on an arm 27' on a rack bar 28 mounted to reciprocate in guides 29 extending lengthwise of the strip 21.

The mechanism for reciprocating the pad 27 includes an air operated piston motor 30 comprising a vertical cylinder carried on a standard 31. The motor 30 is omitted from Fig. 1 to permit a clear view of the gearing directly therebeneath. The piston rod 32 of the motor 30 is connected to a vertical rack bar 33 which engages and drives a pinion 34 keyed to a horizontal shaft 35 to which is also keyed a pinion 36 running in mesh with the rack bar 28. When the motor piston is moved downward, it operates through the rack and gear mechanism just described to move the rack bar 28 and with it the magnetic pad 27 rearwardly. During this rearward movement the pad 27 remains deenergized and slides freely over the strip 21 to the dotted line position (Fig. 1). Thereafter the motor piston is moved upward and the pad 27, which at this time is energized, grips the strip 21 and feeds it forward. During the downward movement of the motor piston a piece 20 is severed from the forward end of the strip 21 by a knife 37. The knife blade is pivoted at one end 38 and at its opposite end has an operating connection with the motor piston so that the downward movement of the piston severs the piece 20.

Mechanism for transferring the severed piece 20 to the mold includes a magnetic head 39 connected to a source of electric current through a cable 40. The head 39 is carried on the outer end of a piston rod 41 of a horizontal piston motor 42. The cylinder of this motor has secured thereto a slide block 43 mounted to reciprocate in vertical guides 44 mounted on the base 24 for lifting and lowering the motor and with it the magnetic head 39. The motor 42 is moved up and down by a vertical piston motor 45, the piston rod 46 of which is connected by a head plate 47 with the motor 42.

When the piston rod 41 is retracted, the magnetic head 39 is withdrawn to the dotted line position (Fig. 1) directly over the severed piece 20, the head remaining demagnetized during this movement. During this retraction of the magnetic head the motor 42 is in its lifted position as shown in Fig. 3. The motor 45 now operates to lower the motor 42, thereby moving the head 39 downward into engagement with the piece 20. The head 39 is then magnetized so that it grips the piece 20. The motor 45 then lifts the motor 42 and the latter operates to project the head 39 to the Fig. 3 position in which it is directly over the mold 11. The head 39 is now demagnetized so that the piece 20 drops onto the gob 15 within the mold. After the magnetic head is retracted the press head 17 (Fig. 4) of the mold is lowered and operates to shape the article 16 and at the same time embed the wire mesh within the plastic glass.

The piston motors 30, 45 and 42 may be operated by compressed air or steam, air operated motors usually being preferable for use in connection with the glass molding machine. The operation of the motors is controlled by suitable valve mechanism (not shown) which may include a timer mechanism such as is conventional with air operated glass molding machines for controlling and synchronizing the various operations of the motors.

Modifications may be resorted to within the spirit and scope of my invention.

I claim:

1. Mechanism comprising horizontally reciprocating means for advancing a strip of wire mesh or the like step by step, a cutter, means for actuating the cutter periodically in synchronism with said reciprocating means and while said strip is at rest for severing individual pieces therefrom, electromagnetic means for transferring said severed pieces to a predetermined position, said last mentioned means including a piston motor, and an electromagnetic head attached to the motor piston.

2. Mechanism comprising horizontally reciprocating means for advancing a strip of wire mesh or the like step by step, a cutter, means for actuating the cutter periodically in synchronism with said reciprocating means and while said strip is at rest for severing individual pieces therefrom, electromagnetic means for transferring said severed pieces to a predetermined position, said last mentioned means including a piston motor, an electromagnetic head attached to the motor piston, said piston motor being horizontally disposed and operable to reciprocate said head horizontally, and a second piston motor operatively connected to the first mentioned motor and operable to lift and lower it and with it said electromagnetic head.

3. Means for supporting a roll of wire mesh strip, means for feeding the strip from the roll step by step including a motor, a slide mounted to reciprocate lengthwise of said strip, operating connections between the motor and said slide, and a device carried by said slide for gripping the strip and feeding it forward with the slide and then releasing the strip and permitting the slide to return independently of said strip.

4. Means for supporting a roll of wire mesh strip, means for feeding the strip from the roll step by step including a motor, a slide mounted to reciprocate lengthwise of said strip, operating connections between the motor and said slide, a device carried by said slide for gripping the strip and feeding it forward with the slide and then releasing the strip and permitting the slide to return independently of said strip, a knife, and operating connections between the motor and said knife for actuating the latter during said return movement of the slide and thereby severing a piece from said strip while the latter is at rest.

DONALD A. BRIDGES.